United States Patent [19]

Nagel

[11] Patent Number: 5,271,708
[45] Date of Patent: Dec. 21, 1993

[54] APPARATUS FOR GATHERING AND STORING STACKS OF PHOTOGRAPHIC PRINTS

[75] Inventor: Erich Nagel, Anzing, Fed. Rep. of Germany

[73] Assignee: Agfa-Gevaert Aktiengesellschaft, Leverkusen, Fed. Rep. of Germany

[21] Appl. No.: 942,301

[22] Filed: Sep. 9, 1992

[30] Foreign Application Priority Data

Sep. 13, 1991 [DE] Fed. Rep. of Germany ....... 4130567

[51] Int. Cl.⁵ ............................................ B65G 57/00
[52] U.S. Cl. .................................. 414/790.4; 53/493; 53/168
[58] Field of Search .............. 414/790.3, 790.4, 790.1, 414/790; 198/803.1, 484.1; 271/207, 213, 216; 53/495, 493, 168

[56] References Cited

U.S. PATENT DOCUMENTS

| | | | |
|---|---|---|---|
| 1,313,487 | 8/1919 | Juengst | 198/484.1 |
| 3,526,170 | 9/1970 | Oderman et al. | 414/790.4 |
| 3,751,834 | 8/1973 | Schultes et al. | 53/493 |
| 4,115,981 | 9/1978 | Hell et al. | 53/493 |
| 4,277,061 | 7/1981 | Nagel et al. | 271/302 |
| 4,973,035 | 11/1990 | Signoretto | 414/790.3 |
| 5,052,679 | 10/1991 | Sekino | 414/790.4 |

*Primary Examiner*—David H. Bollinger
*Assistant Examiner*—Carol Wallace
*Attorney, Agent, or Firm*—Darby & Darby

[57] ABSTRACT

Photographic prints which issue from the outlet of the dryer in a developing machine are gathered into stacks, and successive stacks are admitted into successive empty compartments between the outwardly extending partitions of a belt or chain conveyor. The conveyor is advanced in stepwise fashion, to move successive empty compartments to a station for reception of stacks, by a panel which receives motion from a crank drive in such a way that it constitutes an extension of a partition at the station and during a certain stage of movement of such partition behind the stack in the freshly filled compartment. This renders it possible to maintain in proper orientation stacks which are assembled of relatively small, medium-sized or large prints.

15 Claims, 3 Drawing Sheets

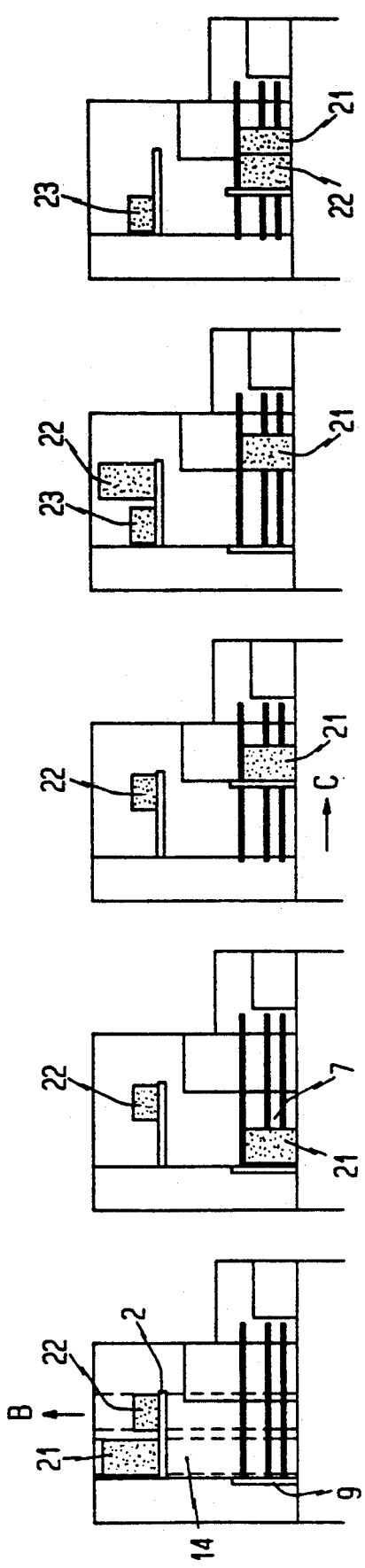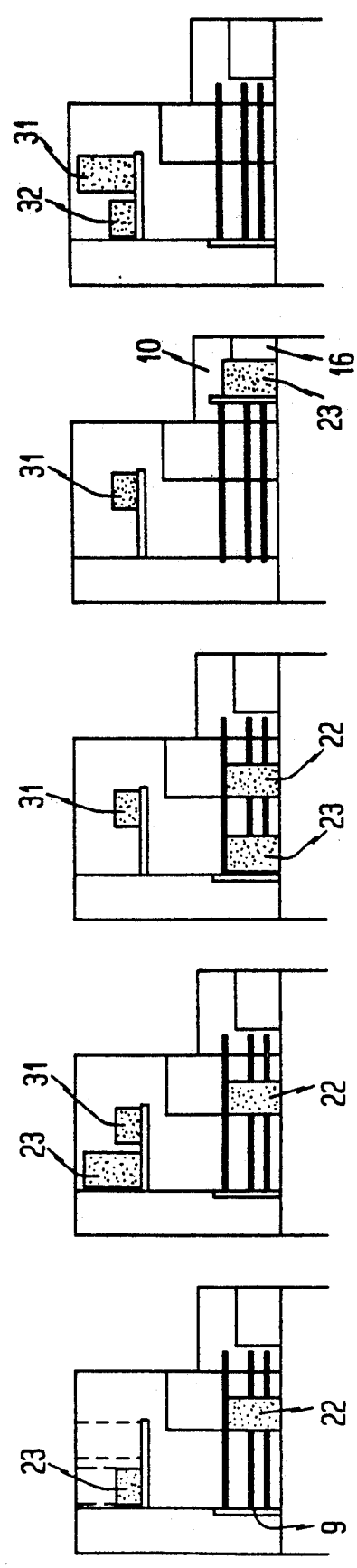

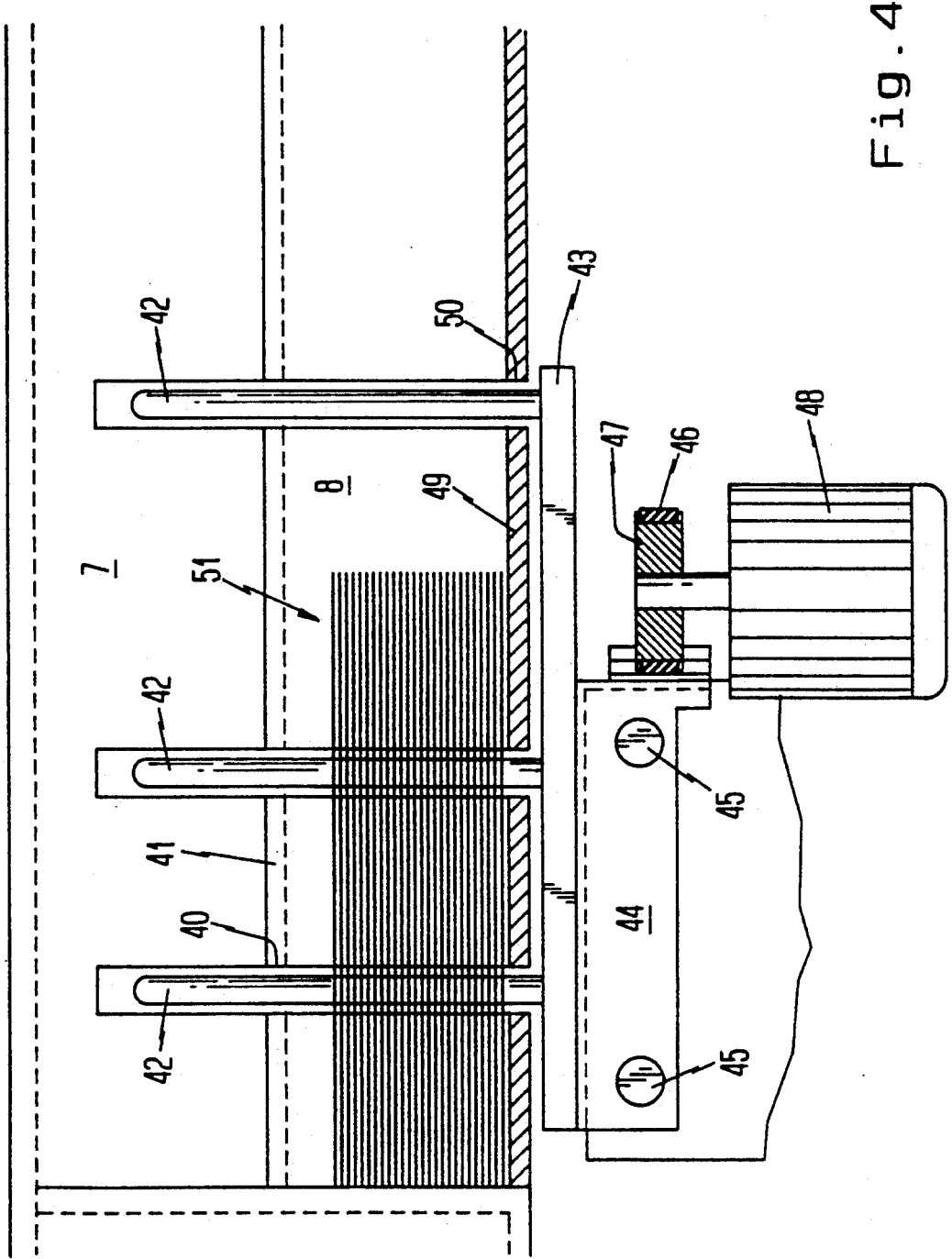

APPARATUS FOR GATHERING AND STORING STACKS OF PHOTOGRAPHIC PRINTS

BACKGROUND OF THE INVENTION

The invention relates to improvements in apparatus for manipulating sheet-like products, and more particularly to improvements in apparatus for gathering and storing stacks of sheets. Still more particularly, the invention relates to improvements in apparatus which can be utilized with advantage as a means for gathering and temporarily storing stacks of photographic prints and the like.

Many amateur photographers desire to obtain developed photographic films and prints of all frames, or selected frames, or freshly developed photographic films as expeditiously as possible. This has given rise to the establishment of large numbers of photographic laboratories which specialize in so-called one-hour service, i.e., developed photographic films and the corresponding prints of selected frames, or all frames, of the developed films are available to customers within 60 minutes from the time of delivery of exposed but undeveloped films. As a rule, a photographic laboratory which specializes in such so-called one-hour service utilizes two apparatus, namely a film developing machine and a so-called minilab which is a combination of a film copying machine and a developing machine for photographic paper. A drawback of many presently known apparatus is that their space requirements are excessive and that they can be properly serviced only by skilled or reasonably skilled persons.

Attempts to reduce the space requirements of presently known apparatus which are utilized to rapidly complete the development of exposed photographic films and the making of necessary prints include the utilization of endless conveyors which define a series of compartments for stacks of developed photographic prints. Each compartment receives a stack of freshly developed prints which belong to a particular customer order. The conveyor is provided with its own motor which advances the compartments along an endless path so that successive compartments reach a loading station for reception of stacks of prints. Such prints have issued from a developing machine for photographic paper and are stacked by dropping them into the compartment at the loading station. The conveyor is advanced by a step as soon as the compartment at the loading station has received a full stack of prints belonging to a particular customer order. One or more attendants are employed to withdraw stacks of prints from their compartments and to introduce the withdrawn stacks into customer envelopes. Such envelopes further receive the corresponding exposed and freshly developed customer films.

The walls or partitions which flank the compartment at the loading station are normally inclined to the vertical to facilitate introduction of photographic prints. Such partitions are thereupon caused to assume substantially vertical positions while a next-following compartment is in the process of receiving prints at the loading station. In order to maintain the prints of an assembled stack in proper positions relative to each other, the dimensions of the partitions must be selected with a view to ensure that the prints in the compartment between them will remain parallel or nearly parallel to each other as well as to the nearest partitions. This is possible only if the height of an upright partition at least equals one-half the height of a print in the adjacent compartment. Thus, the height of partitions must be selected in such a way that it equals or exceeds one-half the height of the largest or longest prints to be stacked in the compartments of the conveyor. This necessitates the utilization of relatively large and bulky partitions which contribute significantly to the bulk of the conveyor and hence to the bulk of the respective apparatus. The situation is aggravated due to the fact that the partitions must extend outwardly well beyond their carrier (such as a belt or chain) not only along that stretch or run of the carrier which is adjacent the aforementioned loading station but also along the other (return) stretch or run of such carrier. In other words, the space requirements of the conveyor are increased by twice the increase of the length of a partition.

OBJECTS OF THE INVENTION

An object of the invention is to provide an apparatus which can be utilized to gather and temporarily store stacks of sheets, particularly freshly developed photographic prints, in a small area without affecting the integrity of stacks.

Another object of the invention is to provide the apparatus with a novel and improved conveyor for temporary storage of stacks of sheets of photographic paper or the like.

A further object of the invention is to provide a novel and improved method of temporarily increasing the effective size of partitions flanking the compartments of the stack receiving and storing conveyor.

An additional object of the invention is to provide an apparatus wherein the conveyor for the partitions need not be provided with a discrete prime mover.

Still another object of the invention is to provide an apparatus which can properly manipulate relatively small or relatively large sheets without resorting to a bulky conveyor for stacked sheets.

A further object of the invention is to provide a novel and improved laboratory which embodies the above outlined apparatus.

Another object of the invention is to provide a novel and improved combination of means for developing prints of photographic paper and means for stacking and temporarily storing freshly developed prints.

An additional object of the invention is to provide a novel and improved mechanism for stacking prints of photographic paper and of manipulating the stacks on their way into the compartments of the above outlined conveyor.

Still another object of the invention is to provide the above outlined apparatus with novel and improved means for stacking related photographic prints (particularly prints belonging to discrete customer orders) in a time- and space-saving manner.

A further object of the invention is to provide an apparatus which is simple so that it can be operated by persons having little skill or no skill or hardly any technical skill.

Another object of the invention is to provide an apparatus which can gather and temporarily store stacks of large or small photographic prints in any random sequence.

SUMMARY OF THE INVENTION

The invention is embodied in an apparatus for temporarily storing sheets of paper and the like, particularly for temporarily storing photographic prints issuing from a developing machine. The improved apparatus comprises a flexible carrier which is movable in a predetermined direction along an endless path, a series of successive neighboring partitions (e.g., in the form of plates, grids or the like) which are supported by and extend outwardly from the carrier and define a succession of sheet-receiving compartments, a sheet supporting or propping member which is adjacent the carrier and is movable to and from at least substantial alignment with successive partitions to constitute a temporary outward extension of the aligned partition during movement of the aligned partition along a predetermined portion of the path, means for moving the supporting member to and from alignment with successive partitions and along the predetermined portion of the path, and means for supplying sheets to successive compartments prior to advancement of such compartments beyond the predetermined portion of the path.

The carrier can include or constitute at least one endless flexible element (such as a belt or chain), and the supporting member can constitute a panel or a like structure which is at least substantially coplanar with the aligned partition during movement along the predetermined portion of the path.

The predetermined portion of the path is preferably located upstream of an arcuate second portion of such path, and the moving means can include a crank drive or other suitable means for pivoting the supporting member about an axis which coincides with the center of curvature of the arcuate second portion of the path. Such moving means can include means for moving the supporting member back and forth along a second path.

The apparatus further comprises means for moving the carrier along the predetermined path. In accordance with a presently preferred embodiment of the invention, the means for advancing the carrier includes or is constituted by the supporting member; this ensures highly accurate synchronization of intermittent advancements of the carrier with the movements of the supporting member. The arrangement may be such that the moving means includes the aforementioned crank drive or analogous means for moving the supporting member in and substantially counter to the predetermined direction, and the advancing means includes means for entraining the carrier and the partitions during movement of the supporting member in the predetermined direction. The entraining means can include a pawl on the supporting member or other suitable means for temporarily coupling the supporting member with the aligned partition.

The supplying means can include means for accumulating a series of stacks of overlapping sheets and for transferring successive stacks of the series into successive empty compartments. The accumulating and transferring means can comprise a reciprocable pusher for stacks of overlapping sheets.

If the stacks consist of photographic prints which constitute reproductions of frames of discrete films, certain prints preferably bear information (e.g., in the form of a bar code) which denotes that the information-bearing print is the last print of a succession of prints to be accumulated into a stack. The supplying and transferring means then preferably comprises a detector having means for monitoring the prints in order to generate signals in response to detection of information, and means (such as the aforementioned pusher) for introducing a stack into an empty compartment upon detection of an information-bearing print.

The supplying means can further comprise means for transporting at least one file of successive sheets (such as photographic prints) along a further path (e.g., in the dryer of a developing machine for photographic prints), the aforementioned means for accumulating successive sheets of the at least one file into successive stacks, and the aforementioned means for transferring successive stacks into successive empty compartments. The transporting means can include means for advancing the sheets of the at least one file in a second direction (e.g., upwardly) along the further path, the accumulating means can include means for shifting successive sheets of the at least one file substantially transversely of the second direction to a stacking station, and the transferring means can include means for shifting successive stacks from the stacking station into successive compartments. The means for shifting stacks can include or constitute the means (such as the aforementioned reciprocable pusher) for shifting successive sheets.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawings.

BRIEF DESCRIPTION OF THE DRAWINGS

FIGS. 3a to 3i and 3k illustrate different stages of gathering two successive stacks of sheets ahead of the conveyor which is driven by the sheet supporting member, the sheets being supplied by the dryer of a developing machine wherein the prints are developed and dried while forming two files, the prints of one file being staggered relative to the prints of the other file; and FIG. 4 illustrates the mechanism for transferring sheets from the outlet of the dryer of the developing machine into a first magazine and thence into a stack-collecting second magazine, and for transferring stacks from the second magazine into successive compartments.

DESCRIPTION OF THE PREFERRED EMBODIMENTS

Figure 2:
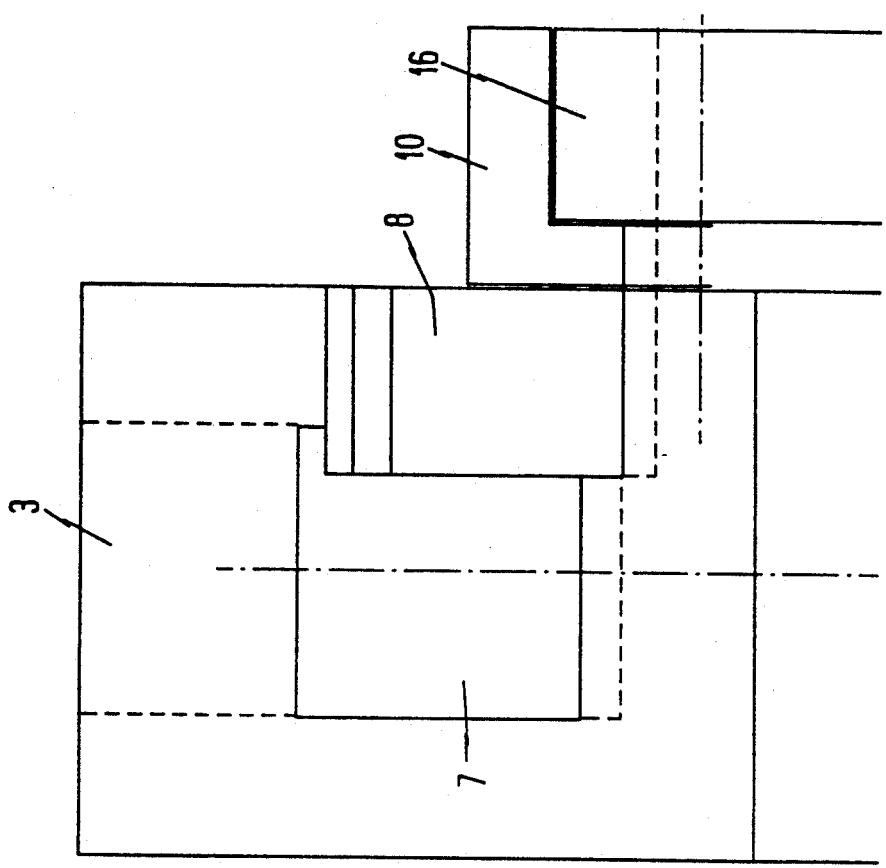
FIG. 2 is a front elevational view of the apparatus as seen from the left-hand side of FIG. 1.
Figure 1:
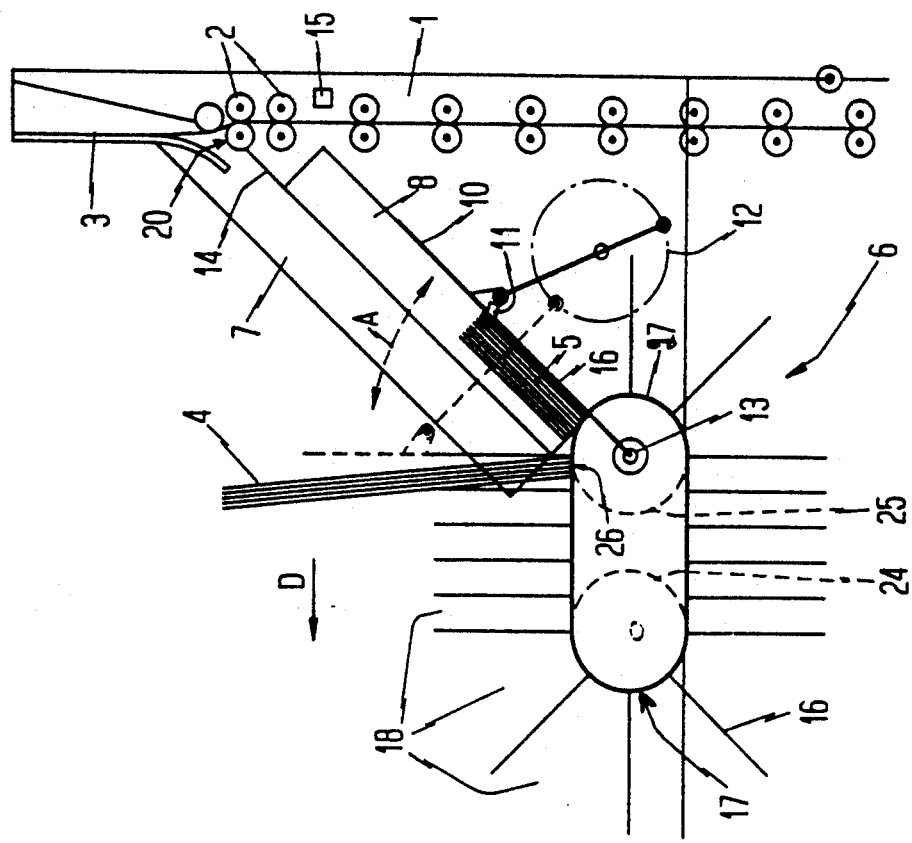
FIG. 1 is a side elevational view of an apparatus which embodies one form of the invention.

Referring first to FIGS. 1 and 2, there is shown an apparatus including an endless belt or chain conveyor 6 for stacks (such as those shown at 4 and 5) of overlapping sheets, for example, freshly developed prints of photographic paper. Certain prints are shown in FIGS. 3a to 3k, as at 21, 22, 23 and 31, 32. The conveyor 6 is adjacent the outlet 20 of a dryer 1 forming part of a developing machine and constituting one element of the means for supplying sheets (prints) to successive compartments 18 which are defined by the partitions or walls 16 of the conveyor 6. The dryer 1 includes pairs of rollers 2 which serve to transport one or more files of successive sheets (hereinafter called prints) along one or more elongated paths in the direction of arrow B (see FIG. 3a). The outlet 20 is flanked in part by a deflector 3 which cooperates with the nearest transporting rollers 2 to divert successive prints from their path in the dryer 1 into a magazine 7.

The conveyor 6 further comprises an endless flexible carrier 17 (e.g., one or more endless chains or belts) which is advanced in stepwise fashion in the direction of arrow D and advances the partitions 16 along an endless path so that successive compartments 18 advance toward and come to a halt at a stacking station 19 (see FIG. 3e) for reception of a complete stack of overlapping prints belonging to a customer order. The carrier 17 is trained over a plurality of pulleys or sprocket wheels including those shown at 24 and 25.

The magazine 7 can include or constitute a downwardly inclined tray or ramp 14 which receives successive prints of a customer order from the outlet 20 of the dryer 1 (i.e., from the developing machine) and temporarily stores such prints during gathering of a stack (such as the stack 5 shown in FIG. 1) which is ready to be transferred into a second magazine 8 in line with the compartment 18 at the station 19. A pusher 9 (shown in FIGS. 3a to 3k) is provided to shift successively discharged prints first into the magazine 7 and to thereupon shift or transfer successive stacks into the magazine 8 wherein the stacks can descend by gravity to enter the adjacent empty compartment 18 at the station 19.

In accordance with a feature of the invention, the apparatus which is shown in FIGS. 1 and 2 further comprises a sheet supporting member 10 in the form of a panel, grid or the like (hereinafter called panel) and a drive 12 for moving the panel 10 along a path wherein the panel moves back and forth (in and at least substantially counter to the direction indicated by arrow D) so that it can constitute an extension of one of the two partitions 16 at the station 19 as well as during movement of the adjacent (aligned) partition 16 along a portion of the endless path defined by the carrier 17. Such portion of the path is indicated at 26 and is located immediately downstream of an arcuate second portion 27 defined by that portion of the carrier 17 which is trained over the right-hand half of the pulley 25 of FIG. 1. The center of curvature of the arcuate path portion 27 is indicated at 13, and such center is located on the imaginary pivot axis for the panel 10. The drive 12 can constitute a crank drive which is designed to pivot the panel 10 along its path in such a way that, during each of its cycles, the panel moves back and forth in directions indicated by a double-headed arrow A, namely between an initial position of alignment with the nearest partition 16 (as indicated in FIG. 1 by solid lines) and a position of alignment with the same partition (indicated in FIG. 1 by broken lines) subsequent to movement with such partition in the direction of arrow D, namely along the portion 26 of the endless path which is defined by the carrier 17.

In accordance with another feature of the invention, the panel 10 forms part of or constitutes a means for advancing the partitions 16 along their endless path in the direction of arrow D. In the illustrated embodiment, the means for advancing the partitions 16 (and hence the carrier 17) along the endless path further comprises a pawl 11 or another suitable entraining device which temporarily couples the panel 10 to the aligned partition 16 only during movement of the panel along the path portion 26 and in the direction of arrow D. The coupling including the pawl 11 is automatically disengaged from the aligned partition 16 when the panel 10 reaches the broken-line position of FIG. 1, and the panel 10 is then free to return toward the solid-line position of FIG. 1, i.e., into alignment with the next-following partition 16. The same procedure is repeated again and again, and each such procedure begins when the compartment 18 at the station 19 has received a complete stack of prints, i.e., a stack belonging to a particular customer order and composed of prints which depict information on one, some or all of the frames of a freshly developed and copied customer film.

A presently preferred mode of gathering stacks of prints in the magazine 7 and of shifting freshly gathered stacks into the magazine 8 for delivery into the registering compartment 18 will be described with reference to FIGS. 3a to 3k. The airs of rollers 2 in the dryer 1 are designed to advance two files of freshly developed photographic prints in the direction of arrow FIG. 3a shows two prints 21, 22 which belong to the two files and are being advanced by the rollers 2 in the direction of arrow B. The prints (including 21, 22) forming the two files are staggered relative to each other, as seen in the direction of arrow B, i.e., the print 21 of the first file reaches the outlet 20 ahead of the print 22 of the second file. The print 21 reaches and is deflected by the suitably inclined deflector or ramp 14 to enter the magazine 7. FIG. 3b shows the print 21 in the magazine 7 subsequent to deflection by the ramp 14. The pusher 9 is maintained in the retracted position of FIGS. 3a and 3b during advancement of the print 21 along the ramp 14 and into the magazine 7. The pusher 9 is then caused to shift the print 21 from the magazine 7 (note the arrow C in FIG. 3c) and into the magazine 8. The latter is located at a level below the level of the magazine 7 so that it can gather a number of prints (including the prints 21, 22 and 23) into a stack (e.g., the stack 5 shown in FIG. 1). The pusher 9 moves the print 21 sidewise across the full width of the magazine 7 to ensure the shifting of such print into the magazine 8 where the print 21 descends onto the previously shifted print (if any) belonging to the same customer order.

The pusher 9 is thereupon returned to the retracted position of FIG. 3a or 3b (see FIG. 3d). In the meantime, the rollers 2 of the dryer 1 have advanced the next print 22 of the same customer order into the range of the ramp 14, and a further print 23 of the same customer order is on its way toward engagement with the ramp 14. This is shown in FIG. 3d. The print 22 thereupon descends along the ramp 14 to enter the magazine 7, and the pusher 9 is again caused to perform a stroke in the direction of arrow C in order to shift the print 22 transversely of the magazine 7 and into the magazine 8 where the print 22 comes to a rest on the print 21 (see FIG. 3e). The next step involves return movement of the pusher 9 to its retracted position (FIG. 3f).

The rear sides of the prints are provided with information in the form of suitable indicia (e.g., a bar code) identifying the prints as belonging to a particular customer order and possibly containing certain additional information. The information is applied to prints 21, 22, etc. prior to introduction into the developing machine including the dryer 1, and such information is monitored by a suitable detector 15 (FIG. 1) while the prints are in the process of advancing toward the ramp 14. The thus obtained signals are used to control the operation of the mechanism (not shown) which serves to move the pusher 9 relative to the magazines 7 and 8.

The print 31 which is shown in FIGS. 3g, 3h, 3i and 3k belongs to a customer order other than that including the prints 21 to 23. Thus, the information at the rear side of the print 31 is different from the information at the rear sides of the prints 21, 22 and 23. Otherwise stated, the information at the rear side of the print 23 is the information denoting the last print of a preceding customer order, and the information at the rear side of the print 31 is indicative of the first print of the next-following customer order (i.e., a different customer order). When the print 23 has descended along the ramp 14 and into the magazine 7, the means for supplying successive stacks of prints into successive compartments 18 must be activated to transfer the freshly gathered stack (e.g., 5) from the magazine 8 into the compartment 18 at the station 19. The activation involves a movement of the pusher 9 from the retracted position of FIGS. 3f, 3g and 3h to a second (fully) extended position of FIG. 3i in which the freshly gathered stack including the prints 21, 22 and 23 is expelled from the magazine 8 into the aligned compartment 18. The pusher 9 includes a first portion which is used to transfer or shift discrete prints from the magazine 7 into the magazine 8, and a second portion which is used to transfer or shift successively gathered stacks from the magazine 8 into successive aligned compartments 18. Thus, when the first portion of the pusher 9 has completed the shifting of the last print 23 of a customer order from the magazine 7 into the magazine 8, the pusher 9 continues to move in the direction of arrow C (in response to the signal from the detector 15 which has detected the last print 23 of the preceding order or the first print 31 of the next-following order) so that the freshly gathered stack is shifted or transferred from the magazine 8 and is permitted or compelled to enter the compartment 18 at the station 19. At such time, the panel 10 is or can be idle and is maintained in the solid-line position of FIG. 1, namely in a position of alignment with the partition 16 immediately behind the compartment 18 at the station 19. The crank drive 12 thereupon causes the panel 10 to move from the solid-like position toward the broken-line position of FIG. 1 whereby the pawl 11 entrains the aligned partition 16 in the direction of arrow D with attendant change of orientation (inclination) of the freshly filled compartment 18 and of the two partitions 16 flanking this compartment. At such time, the pusher 9 is maintained in the retracted position of FIG. 3k and the rollers 2 of the dryer 1 advance the foremost prints 31, 32 of the next-following customer order toward the ramp 14. In FIG. 3k, the positions of the prints 31, 32 correspond to those of the prints 22 and 21 shown in FIG. 3a. The gathering of the stack including the prints 31 and 32 then proceeds in the same way as described above in connection with the gathering of the stack including the prints 21 and 22.

The panel 10 props the stack 5 in the adjacent compartment 18 from behind during movement of the respective partitions 16 along the path portion 26, i.e., during movement of the stack 5 from the inclined position of FIG. 1 toward the upright position corresponding to that of the preceding stack 4. The prints of the stack 5 are relatively short (as considered radially outwardly from the pulley or sprocket wheel 25) so that the provision of the extension or panel 10 for the transport of stack 5 with the carrier 17 of the conveyor 6 might not be absolutely necessary. However, the prints of the preceding stack 4 are much longer and would be likely to fall out of the respective compartment 18 during dwell of such compartment, in a strongly inclined position, at the station 19.

When the movement of the panel 10 to the broken-line position of FIG. 1 is completed, the crank drive 12 begins to move the panel counter to the direction which is indicated by the arrow D. This causes the pawl 11 to ride over the partition 16 immediately following the previously advanced partition. The pawl 11 engages the partition 16 which is then aligned with the panel 10 as soon as the latter reassumes the solid-line position of FIG. 1. The panel 10 is then ready to constitute an extension of the aligned partition during transfer of the next stack from the magazine 8 into the registering compartment 18 as well as during the next-following stepwise advance of the aligned partition 16 along the path portion 26.

An important advantage of the panel 10 and of its drive 12 is that this panel enables the conveyor 6 to reliably store and advance relatively short prints (note the stack 5) as well as very long prints (stack 4). In other words, the partitions 16 need not extend well beyond the carrier 17 which renders it possible to greatly reduce the space requirements of the conveyor 6 and of the entire apparatus. The panel 10 is dimensioned to enhance the ability of the aligned partition 16 to adequately support long and/or medium long prints and to thus ensure proper orientation of the prints forming a stack regardless of the exact size of the prints. The dimensions of the panel 10 are preferably selected in such a way that the combined length of a partition 16 plus the panel 10 (as measured radially of the center of curvature 13 of the path portion 27) is not less than half the length of the longest prints which are to be manipulated in the apparatus including the conveyor 6. Once the prints of the stack 4 reach the positions which are shown in FIG. 1, the adjacent partitions 16 are capable of retaining the prints in such positions even if their length is less than half the length of a print in the stack 4. Thus, a relatively small (compact) conveyor 6 suffices to store and transport long stacks (such as the stack 4), short stacks (such as the stack 5) or stacks having a medium length.

The improved apparatus can be modified in a number of ways without departing from the spirit of the invention. For example, only the last print (such as 23) of a customer order can bear information, and such information identifies it as the last print. The information is decoded by the detector 15 which transmits an appropriate signal to the means for reciprocating the pusher 9 so that the latter performs a longer stroke and transfers the last print of the customer order not only into and beyond the magazine 7, i.e., all the way into and beyond the magazine 8 whence the stack advances into the registering compartment 18.

Though it is possible to lengthen the path portion 26, it is normally necessary to prop a stack in the corresponding compartment 18 only during movement of the stack from an inclined position (stack 5 in FIG. 1) to an upright position (stack 4 in FIG. 1). Once the prints of a stack reach the positions corresponding to those of the stack 4 in FIG. 1, relatively short partitions 16 suffice to adequately hold the prints in optimum positions. For example, the length of the partitions 16 need not exceed one-third of the length of prints in the stack 4.

The apparatus can be provided with a discrete drive for the carrier 17 of the conveyor 6, i.e., this carrier need not receive motion from the panel 10. However, the structure which is shown in the drawing is preferred at this time because the movements of the conveyor 6 are automatically synchronized with the movements of the panel 10 when the latter is in the process of moving from the solid-line position toward the broken-line position of FIG. 1. In addition, the absence of a discrete drive for the carrier 17 of the conveyor 6 renders it possible to further reduce the space requirements of the improved apparatus.

The conveyor 6 can be used in combination with a developing machine wherein the dryer 1 is designed to convey one, two or more files or rows of prints bearing the images of film frames. The utilization of a dryer which can transport several files of freshly developed prints also contributes to compactness of the apparatus.

The provision of a single pusher 9 which serves as a means for shifting discrete prints from the magazine 7 into the magazine 8 and also a means for shifting gathered stacks of prints from the magazine 8 toward or directly into an empty compartment 18 at the station 19 also contributes to compactness of the improved apparatus.

The detector 15 is preferably installed close to the ramp 14, i.e., close to the outlet 20 where the two files of prints leave the path which is defined by the rollers 2 and advance into the range of the pusher 9. This detector can be designed to discriminate between indicia denoting prints belonging to different customer orders or to detect a single type of indicia denoting the last prints of successive series of prints belonging to particular customer orders.

FIG. 4 shows a pusher having several pins or prongs 42 which can pass through slots 40 in the bottom wall 49 and a sidewall of the magazine 7 as well as through registering slots 50 in the bottom wall 49 and a sidewall of the magazine 8. The pins 42 are mounted on a base plate 43 secured to a carriage 44 which is reciprocable along parallel guide rods 45. The means for reciprocating the carriage 44 along the guide rods 45 includes a reversible electric motor 48 and a suitable transmission, e.g., a transmission including a toothed belt 46 and a toothed pulley 47.

The magazine 7 receives sheets from the outlet 20 of the dryer 1. A sheet which has descended onto the bottom wall 41 of the magazine 7 is engaged by the pins 42 and is advanced toward and descends onto the bottom wall 49 of the magazine 8 where it forms part of a growing stack 51. When the stack 51 contains a required number of sheets, the detector 15 transmits a signal which causes the motor 48 to effect the transfer of such fully grown stack into the compartment 18 at the station 19. The magazine 8 is then ready to receive the first sheet of the next-following stack.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for temporarily storing sheets of paper and the like, particularly photographic prints issuing from a developing machine, comprising a flexible carrier movable in a predetermined direction along an endless path; a series of successive neighboring partitions supported by and extending outwardly from said carrier and defining a succession of sheet-receiving compartments; a sheet supporting member adjacent said carrier and movable to and from at least substantial alignment with successive partitions to constitute a temporary outward extension of the aligned partition during movement of the aligned partition along a portion of said path; means for moving said member to and from alignment with successive partitions and along said portion of said path; and means for supplying sheets to successive compartments prior to advancement of such compartments beyond said portion of said path, said portion of said path being located upstream of an arcuate second portion having a center of curvature, said moving means including means for pivoting said member about an axis which coincides with said center of curvature.

2. The apparatus of claim 1, wherein said carrier is an endless flexible carrier and said member includes a panel which is at least substantially coplanar with aligned partitions during movement along said portion of said path.

3. The apparatus of claim 1, wherein said moving means comprises means for moving said member back and forth along a second path.

4. The apparatus of claim 1, further comprising means for advancing said carrier along said path.

5. The apparatus of claim 4, wherein said advancing means includes said member.

6. The apparatus of claim 1, wherein said supplying means comprises means for accumulating a series of stacks of overlapping sheets and for transferring successive stacks of said series into successive compartments.

7. The apparatus of claim 6, wherein said accumulating and transferring means comprises a reciprocable pusher for stacks.

8. The apparatus of claim 6 for temporarily storing stacks each consisting of photographic prints constituting reproductions of frames of discrete films and including a print bearing information denoting such print as the last print of a succession of prints to be accumulated into a stack, said supplying and transferring means including a detector having means for monitoring the prints for the presence of said information and means for introducing a stack into a compartment upon detection of an information-bearing print.

9. The apparatus of claim 1, wherein said supplying means comprises means for transporting at least one file of successive sheets along a further path, means for accumulating successive sheets of said at least one file into successive stacks, and means for transferring successive stacks into successive compartments.

10. Apparatus for temporarily storing sheets of paper and the like, particularly photographic prints issuing from a developing machine, comprising a flexible carrier movable in a predetermined direction along an endless path; a series of successive neighboring partitions supported by and extending outwardly from said carrier and defining a succession of sheet-receiving compartments; a sheet supporting member adjacent said carrier and movable to and from at least substantial alignment with successive partitions to constitute a temporary outward extension of the aligned partition during movement of the aligned partition along a portion of said path; means for moving said member to and from alignment with successive partitions and along said portion of said path; and means for supplying sheets to successive compartments prior to advancement of such compartments beyond said portion of said path; means for advancing said carrier along said path, said advancing means including said member, said moving means including means for moving said member in and substantially counter to said direction, said advancing means comprising further moving means for moving said carrier and said partitions during movement of said member in said direction.

11. The apparatus of claim 10, wherein said further moving means comprises means for temporarily coupling said member with aligned partitions.

12. The apparatus of claim 10, wherein said further moving means comprising means for entraining said carrier and said partitions during movement of said member in said direction.

13. Apparatus for temporarily storing sheets of paper and the like, particularly photographic prints issuing from a developing machine, comprising a flexible carrier movable in a predetermined direction along an endless path; a series of successive neighboring partitions supported by and extending outwardly from said carrier and defining a succession of sheet-receiving compartments; a sheet supporting member adjacent said carrier and movable to and from at least substantial alignment with successive partitions to constitute a temporary outward extension of the aligned partition during movement of the aligned partition along a portion of said path; means for moving said member to and from alignment with successive partitions and along said portion of said path; and means for supplying sheets to successive compartments prior to advancement of such compartments beyond said portion of said path, said supplying means comprising means for transporting at least one file of successive sheets along a further path, means for accumulating successive sheets of said at least one file into successive stacks, and means for transferring successive stacks into successive compartments, said transporting means including means for advancing the sheets of said at least one file in a second direction along said further path, said accumulating means including means for shifting successive sheets of said at least one file substantially transversely of said second direction to a stacking station and said transferring means including means for shifting successive stacks from said station into successive compartments.

14. The apparatus of claim 13, wherein said means for shifting successive stacks includes said means for shifting successive sheets.

15. The apparatus of claim 13, wherein said means for shifting successive stacks constitutes said means for shifting successive sheets.

* * * * *